United States Patent
Venkataramanan et al.

(10) Patent No.: US 8,529,193 B2
(45) Date of Patent: Sep. 10, 2013

(54) GAS TURBINE ENGINE COMPONENTS WITH IMPROVED FILM COOLING

(75) Inventors: Jyothishkumar Venkataramanan, Tamil Nadu (IN); Gopal Samy Muthiah, Tamil Nadu (IN); Dhinagaran Ramachandran, Karnataka (IN); Balamurugan Srinivasan, Karnataka (IN); Malak Fouad Malak, Tempe, AZ (US); Jong Liu, Scottsdale, AZ (US); Luis Tapia, Maricopa, AZ (US); Daniel Crites, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 959 days.

(21) Appl. No.: 12/625,854

(22) Filed: Nov. 25, 2009

(65) Prior Publication Data

US 2011/0123312 A1 May 26, 2011

(51) Int. Cl.
*F03B 11/00* (2006.01)

(52) U.S. Cl.
USPC .......................................... 415/115; 416/97 R (58) Field of Classification Search
USPC ..................... 415/115; 416/96 R, 97 R, 97 A
See application file for complete search history.

(56) References Cited

U.S. PATENT DOCUMENTS

| | | | |
|---|---|---|---|
| 4,461,612 A | 7/1984 | Dodd | |
| 4,526,358 A | 7/1985 | Ura et al. | |
| 4,529,358 A | 7/1985 | Papell | |
| 4,653,983 A | 3/1987 | Vehr | |
| 4,664,597 A | 5/1987 | Auxier et al. | |
| 5,096,379 A | 3/1992 | Stroud et al. | |
| 5,261,223 A | 11/1993 | Foltz | |
| 5,281,084 A | 1/1994 | Noe et al. | |
| 5,382,133 A | 1/1995 | Moore et al. | |
| 5,465,572 A | 11/1995 | Nicoll et al. | |
| 5,496,151 A | 3/1996 | Coudray et al. | |
| 5,511,937 A | 4/1996 | Papageorgiou | |
| 5,609,779 A | 3/1997 | Crow et al. | |
| 5,683,600 A | 11/1997 | Kelley et al. | |
| 5,747,769 A | 5/1998 | Rockstroh et al. | |
| 6,243,948 B1 | 6/2001 | Lee et al. | |
| 6,329,015 B1 | 12/2001 | Fehrenbach et al. | |
| 6,368,060 B1 | 4/2002 | Fehrenbach et al. | |
| 6,420,677 B1 | 7/2002 | Emer et al. | |
| 6,554,571 B1 | 4/2003 | Lee et al. | |
| 6,607,355 B2 | 8/2003 | Cunha et al. | |

(Continued)

FOREIGN PATENT DOCUMENTS

| EP | 0375175 A1 | 11/1989 |
|---|---|---|
| EP | 0924384 A2 | 6/1999 |

(Continued)

OTHER PUBLICATIONS

Kusterer et al., Double-Jet Film-Cooling for Highly Efficient Film-Cooling with Low Blowing Ratios, Proceedings of ASME Turbo Expo 2008: Power for Land, Sea and Air GT2008, Jun. 9-13, 2008, pp. 1-12, Berlin, Germany, GT2008-50073.

(Continued)

*Primary Examiner* — Dwayne J White
(74) *Attorney, Agent, or Firm* — Ingrassia Fisher & Lorenz, P.C.

(57) ABSTRACT

An engine component includes a body; and a plurality of cooling holes formed in the body. At least one of the cooling holes has cross-sectional shape with a first concave portion and a first convex portion.

13 Claims, 7 Drawing Sheets

(56) References Cited

U.S. PATENT DOCUMENTS

| | | | |
|---|---|---|---|
| 6,616,406 | B2 | 9/2003 | Liang |
| 6,979,176 | B2 | 12/2005 | Nakamata et al. |
| 6,984,100 | B2 | 1/2006 | Bunker et al. |
| 7,008,186 | B2 | 3/2006 | Heeg et al. |
| 7,131,814 | B2 | 11/2006 | Nagler et al. |
| 7,186,085 | B2 | 3/2007 | Lee |
| 7,186,091 | B2 | 3/2007 | Lee et al. |
| 7,246,992 | B2 | 7/2007 | Lee |
| 7,249,933 | B2 | 7/2007 | Lee et al. |
| 7,328,580 | B2 | 2/2008 | Lee et al. |
| 7,351,036 | B2 | 4/2008 | Liang |
| 7,374,401 | B2 | 5/2008 | Lee |
| 7,540,712 | B1 | 6/2009 | Liang |
| 7,997,867 | B1 | 8/2011 | Shih et al. |
| 7,997,868 | B1 | 8/2011 | Liang |
| 8,057,179 | B1 | 11/2011 | Liang |
| 8,057,180 | B1 | 11/2011 | Liang |
| 8,057,181 | B1 | 11/2011 | Liang |
| 2005/0023249 | A1 | 2/2005 | Kildea |
| 2005/0135931 | A1 | 6/2005 | Nakamata et al. |
| 2005/0232768 | A1 | 10/2005 | Heeg et al. |
| 2006/0104807 | A1 | 5/2006 | Lee |
| 2006/0171807 | A1 | 8/2006 | Lee |
| 2006/0272335 | A1 | 12/2006 | Schumacher et al. |
| 2006/0277921 | A1 | 12/2006 | Patel et al. |
| 2007/0006588 | A1 | 1/2007 | Patel et al. |
| 2007/0128029 | A1 | 6/2007 | Liang |
| 2007/0234727 | A1 | 10/2007 | Patel et al. |
| 2008/0003096 | A1 | 1/2008 | Kohli et al. |
| 2008/0005903 | A1 | 1/2008 | Trindade et al. |
| 2008/0031738 | A1 | 2/2008 | Lee |
| 2008/0271457 | A1 | 11/2008 | McMasters et al. |
| 2009/0246011 | A1 | 10/2009 | Itzel |
| 2010/0040459 | A1 | 2/2010 | Ohkita |
| 2010/0124484 | A1 | 5/2010 | Tibbott et al. |
| 2010/0303635 | A1 | 12/2010 | Townes et al. |
| 2011/0097188 | A1 | 4/2011 | Bunker |
| 2011/0217181 | A1 | 9/2011 | Hada et al. |
| 2011/0268584 | A1 | 11/2011 | Mittendorf |
| 2011/0311369 | A1 | 12/2011 | Ramachandran et al. |

FOREIGN PATENT DOCUMENTS

| | | |
|---|---|---|
| EP | 0992653 A1 | 4/2000 |
| EP | 1609949 A1 | 12/2005 |
| EP | 1892375 A1 | 2/2008 |
| EP | 1942251 A2 | 7/2008 |
| EP | 1970628 A2 | 9/2008 |
| JP | 07332005 | 12/1995 |
| JP | 2001012204 | 1/2001 |
| JP | 2006307842 | 11/2006 |

OTHER PUBLICATIONS

Wayne et al., High-Resolution Film Cooling Effectiveness Comparison of Axial and Compound Angle Holes on the Suction Side of a Turbine Vane, Transactions of the ASME, pp. 202-211, Copyright 2007 by ASME.

Lu et al., Turbine Blade Showerhead Film Cooling: Influence of Hole Angle and Shaping, International Journal of Heat and Fluid Flow 28 (2007) pp. 922-931.

Kim et al., Influence of Shaped Injection Holes on Turbine Blade Leading Edge Film Cooling, International Journal of Heat and Mass Transfer 47 (2004) pp. 245-256.

Ramachandran et al., Turbine Engine Components, filed with the USPTO on Jun. 24, 2009 and assigned U.S. Appl. No. 12/490,840.

EP Search Report, EP10187079.8-2321 dated Apr. 2, 2011.

Loh, Teck Seng; Srigrarom, Sutthiphong; Investigative Study of Heat Transfer and Blades Cooling in the Gas Turbine, The Smithsonian/NASA Astrophysics Data System; Modern Physics Letters B, vol. 19, Issue 28-29, pp. 1611-1614 (2005).

Loh, Teck Seng; Srigrarom, Sutthiphong; Investigative Study of Heat Transfer and Blades Cooling in the Gas Turbine, Modern Physics Letters B, vol. 19, Issue 28-29, pp. 1611-1614 (2005).

Ronald S. Bunker; A Review of Shaped Hole Turbine Film-Cooling Technology; Journal of Heat Transfer, Apr. 2005, vol. 127, Issue 4, 441 (13 pages).

Shih, T. I.-P., Na, S.; Momentum-Preserving Shaped Holes for Film Cooling; ASME Conference Proceedings, Year 2007, ASME Turbo Expo 2007: Power for Land, Sea, and Air (GT2007), May 14-17, 2007, Montreal, Canada; vol. 4: Turbo Expo 2007, Parts A and B; Paper No. GT2007-27600, pp. 1377-1382.

Yiping Lu; Effect of Hole Configurations on Film Cooling From Cylindrical Inclined Holes for the Application to Gas Turbine Blades, A Dissertation, Submitted to the Graduate Faculty of the Louisiana State University and Agricultural and Mechanical College, Dec. 2007.

Colban, W., Thole, K.; Influence of Hole Shape on the Performance of a Turbine Vane Endwall Film-cooling Scheme, International Journal of Heat and Fluid Flow 28 (2007), pp. 341-356.

Gartshore, I., Salcudean, M., Hassan, I.: Film Cooling Injection Hole Geometry : Hole Shape Comparison for Compound Cooling Orientation, American Institute of Aeronautics and Astronautics, Reston, VA, 2001, vol. 39, No. 8, pp. 1493-1499.

Okita, Y., Nishiura, M.: Film Effectiveness Performance of an Arrowhead-Shaped Film Cooling Hole Geometry, ASME Conference Proceedings, ASME Turbo Expo 2006: Power for Land, Sea, and Air (GT2006), May 8-11, 2006, Barcelona, Spain, vol. 3: Heat Transfer, Parts A and B, No. GT2006-90108, pp. 103-116.

Lu, Y., Allison, D., Ekkad, S. V.: Influence of Hole Angle and Shaping on Leading Edge Showerhead Film Cooling, ASME Turbo Expo 2006: Power for Land, Sea, and Air (GT2006), May 8-11, 2006, Barcelona, Spain, vol. 3: Heat Transfer, Parts A and B, No. GT2006-90370 pp. 375-382.

Heidmann et al., A Novel Antivortex Turbine Film-Cooling Hole Concept, Journal of Turbomachinery, 2008 by ASME, Jul. 2008, vol. 130, pp. 031020-1-031020-9.

Malak, F.M., et al.; Gas Turbine Engine Components With Film Cooling Holes Having Cylindrical to Multi-Lobe Configurations, U.S. Appl. No. 13/465,647, filed May 7, 2012.

GAS TURBINE ENGINE COMPONENTS WITH IMPROVED FILM COOLING

TECHNICAL FIELD

The present invention generally relates to gas turbine engines, and more particularly relates to air cooled components of gas turbine engines, such as turbine and combustor components.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path, in order to prevent overheating and potential mechanical issues attributable thereto. As such, it is desirable to cool the rotor blades and stator vanes in order to prevent damage and extend useful life. One mechanism for cooling turbine airfoils is to duct cooling air through internal passages and then vent the cooling air through holes formed in the airfoil. The holes are typically formed uniformly along a line substantially parallel to the leading edge of the airfoil and at selected distances from the leading edge to provide a film of cooling air over the convex side of the airfoil when the cooling air flows therethrough during engine operation. Other rows of cooling holes or an array of holes may be formed in the airfoil components depending upon design constraints. Film cooling attempts to maintain the airfoils at temperatures that are suitable for their material and stress level.

A typical film cooling hole is a cylindrical aperture inclined axially through one of the airfoil sides. In many conventional engines, however, disadvantageous, relatively high cooling air flows have been used to obtain satisfactory temperature control of engine components.

Accordingly, it is desirable to provide a gas turbine engine with improved film cooling. In addition, it is desirable to provide a air-cooled turbine components with improved hole configurations. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine component includes a body; and a plurality of cooling holes formed in the body. At least one of the cooling holes has a cross-sectional shape with a first concave portion and a first convex portion.

In accordance with another exemplary embodiment, an engine component, comprising includes a body; and a plurality of cooling holes formed in the body. At least one of the cooling holes has a triangle cross-sectional.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved film cooling. The turbine components have a number of non-circular cooling holes. The cooling holes may have, for example, both convex and concave portions. For example, the cooling holes can have cross-sectional shapes such as: bean-shaped, triad-shaped, reverse B-shaped, dumbbell shaped, and/or triangle-shaped.

Figure 1:
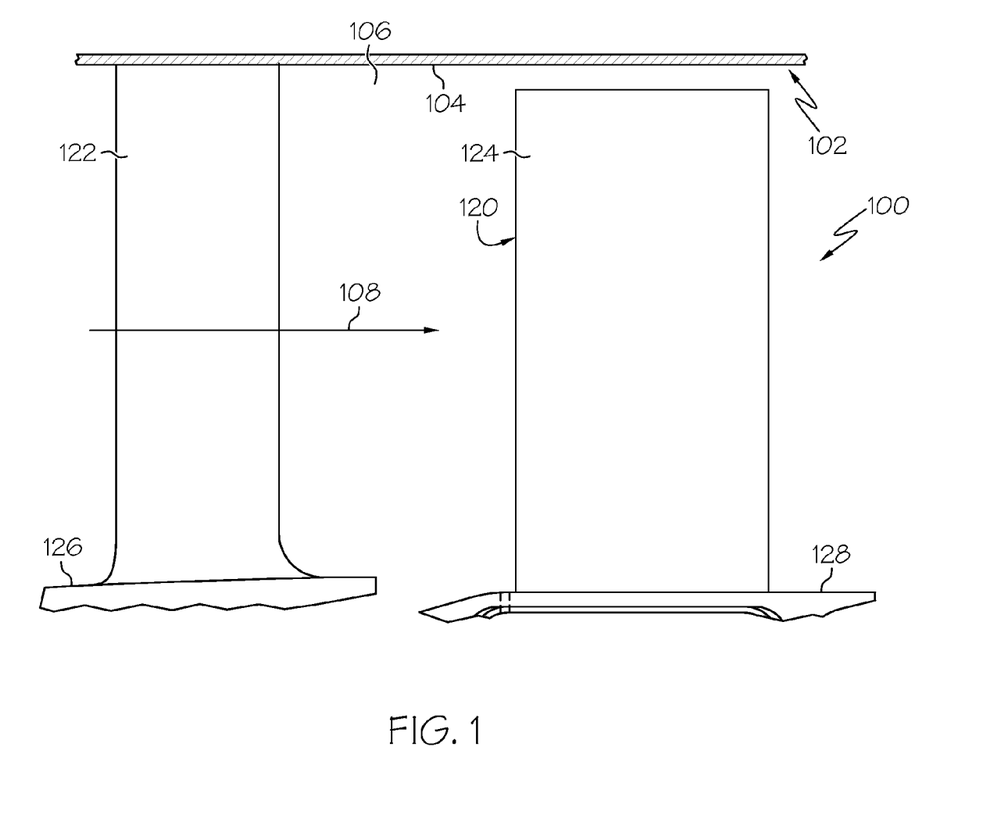
FIG. 1 is a partial, sectional elevation view illustrating a portion of a turbine section of a gas turbine engine in accordance with an exemplary embodiment.

FIG. 1 is a partial sectional elevation view illustrating a portion of a turbine section 100 of a gas turbine engine formed in accordance with an exemplary embodiment. The turbine section 100 and gas turbine engine in general have an overall construction and operation which is understood by persons skilled in the art. In general terms, the turbine section 100 has a housing 102 with an annular duct wall 104 that defines a mainstream hot gas flow path 106 for receiving mainstream gas flow 108 from an engine combustor (not shown). The mainstream hot gas flow 108 flows past axially spaced circumferential rows of airfoils 120, which include stator vanes 122 and rotor blades 124 formed from suitable materials capable of withstanding the high temperature environment within the mainstream hot gas flow path 106.

The stator vanes 122 project radially outwardly from a circumferential platform 126 to the annular duct wall 104. The rotor blades 124 project radially outwardly from a circumferential platform 128 that is adapted for appropriate connection to the rotor disk (not shown) at the periphery thereof. The rotor disk is generally positioned within the internal engine cavity and is coupled to a main engine shaft for rotation therewith. As shown, the rotor blade 124 and stator vane 122 may form one stage of a multistage turbine. As such, multiple rows of the stator vanes 122 and the rotor blades 124 may be provided in the gas turbine section 100, with the rotor blades 124 and associated rotor disks being rotatably driven by the hot gas flowing through the mainstream hot gas flow path 106 for power extraction. A supply of cooling air, typically obtained as a bleed flow from the compressor (not shown), may pass through cooling holes in the airfoils 122, 124 to form a surface cooling film. Although the cooling holes are discussed with reference to turbine components, the cooling holes may also be incorporated into other engine components, such as combustor components. The cooling holes are discussed in greater detail below.

Figure 2:
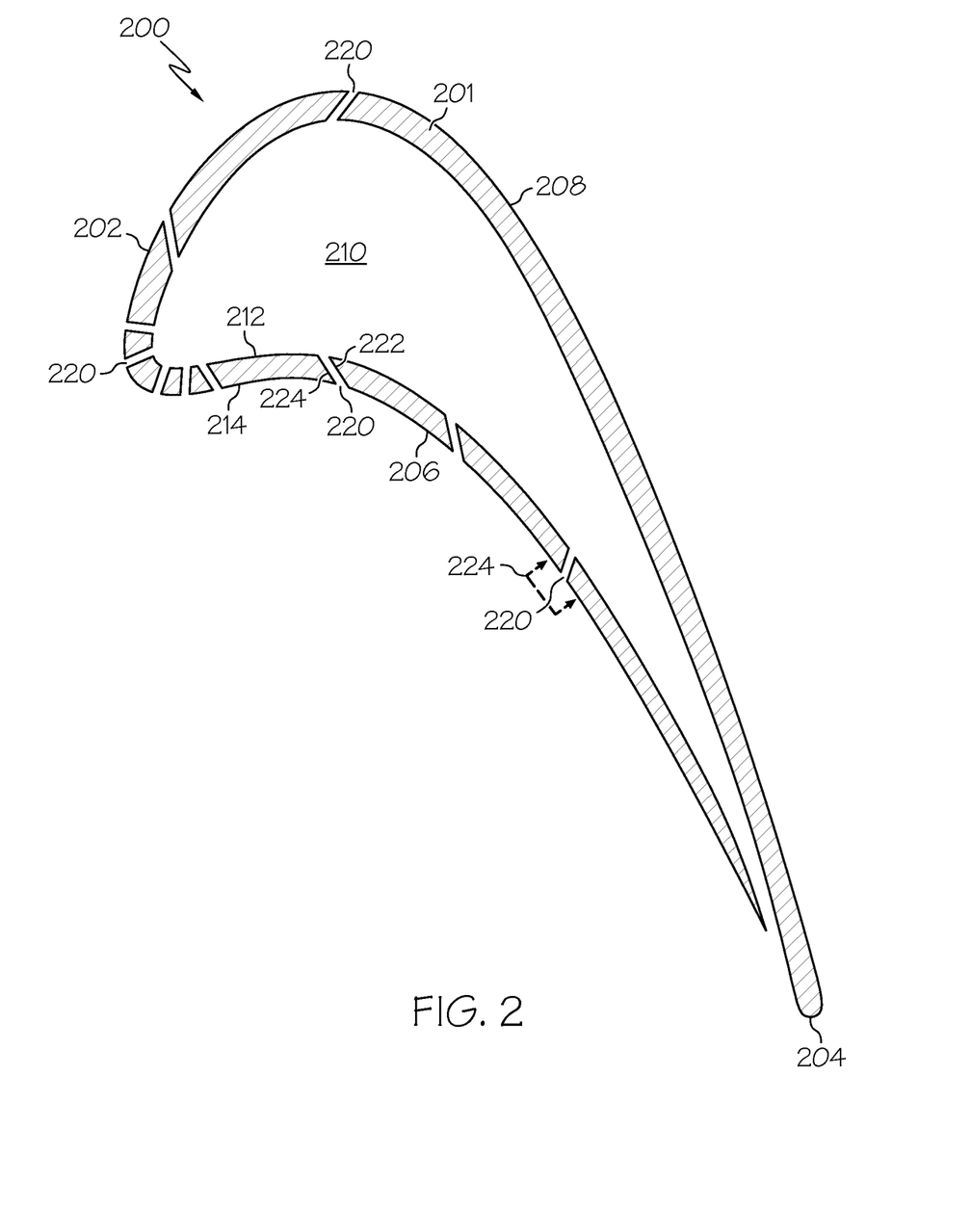
FIG. 2 is a top cross-sectional view of an airfoil that can be incorporated into the turbine section of FIG. 1 in accordance with an exemplary embodiment.

FIG. 2 is a top cross-sectional view of an airfoil 200 that can be incorporated into the turbine section 100 of FIG. 1 in accordance with an exemplary embodiment. In general, the airfoil 200 may correspond to the stator vane 122 or rotor blade 124 of FIG. 1, and the cross-sectional view of FIG. 2 generally corresponds to a horizontal cross-sectional view from the perspective of FIG. 1.

The airfoil 200 generally has a body 201 with a leading edge 202 and an opposite trailing edge 204. The airfoil 200 also includes a pressure sidewall 206 that is generally concave and an opposite, suction sidewall 208 that is generally convex and is spaced-apart from the pressure sidewall 206. The pressure sidewall 206 and suction sidewall 208 extend from leading edge 202 to trailing edge 204. The airfoil 200 has a hollow interior cavity 210 such that the airfoil 200 has an inner surface 212 and an outer surface 214. Airfoils 200 used in high performance gas turbine engines, such as those used for aircraft propulsion, can be made from high heat and high stress resistant aerospace alloys, such as nickel based alloys, Rene 88, Inconel 718, single crystal materials, steels, titanium alloys or the like.

As noted above, the airfoil 200 is subject to extremely high temperatures because high velocity hot gases are ducted from the combustor (not shown) onto the airfoil 200. If unaddressed, the extreme heat may affect the useful life of an airfoil. As such, film cooling is provided for the airfoil 200 to provide a cooling film of fluid onto the surface of the airfoil 200, particularly in the area of the leading edge 202 and areas immediately aft of the leading edge 202. As noted above, cooling air is bled from the compressor (not shown) or other source and passes into the interior cavity 210 and through cooling holes 220 to the outer surface 214 of the airfoil 200. The cooling holes 220 are formed at locations on the airfoil 200, particularly the convex side 206, concave side 208, and leading edge 202, to provide optimum cooling of the engine component.

The cooling holes 220 may be formed in a selected pattern or array to provide optimum cooling. The cooling holes 220 may be disposed at any angle relative to the outer surface 206, such as about 20° to about 40°, although the cooling holes 220 may be oriented at lesser or greater angles. Computational fluid dynamic (CFD) analysis can additionally be used optimize the location and orientation of the cooling holes 220. The cooling holes 220 may be formed by casting, abrasive water jet, Electron Discharge Machining (EDM), laser drilling, or any suitable process.

In general, the cooling holes 220 may be considered to have an upstream portion 222 adjacent the inner surface 212 and a downstream portion 224 adjacent the outer surface 214. The upstream portion of each cooling hole 220, lying closer to the inner surface 212 is substantially cylindrical or circular and the downstream portion lying closer to the outer surface 214 may have a cross-sectional shape as discussed below with reference to FIGS. 3-13, particularly at the outer surface 214. The performance of the airfoil 200 may be directly related to the ability to provide uniform cooling of its surfaces with a limited amount of cooling air. In particular, the size and shape of each hole 220 determine the distribution of the air flow across the downstream surface. Consequently, the cooling holes 220, particularly their cross-sectional shapes, are important design considerations.

Figure 3:
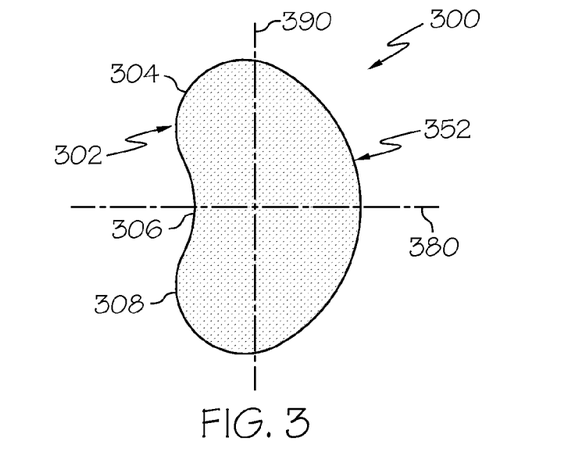
FIGS. 3-7 are cross-sectional views of cooling holes that may be incorporated into the airfoil of FIG. 2 in accordance with an exemplary embodiment.

FIGS. 3-7 are cross-sectional views of cooling holes that may be incorporated into the airfoil of FIG. 2 in accordance with an exemplary embodiment. In reference to FIG. 2, the cross-sectional views of FIGS. 3-7 correspond to view 224. FIG. 3 is a cross-sectional view of a cooling hole 300, which may represent any of the cooling holes 220 discussed in reference to FIG. 2, in accordance with a first exemplary embodiment. The cooling hole 300 may be, for example, bean-shaped.

The cooling hole 300 may be considered to have an x-axis 380 and a y-axis 390, as shown in FIG. 3. The cooling hole 300 may be oriented in any suitable manner, and in one exemplary embodiment, the cooling hole 300 is oriented such that the x-axis 380 is parallel to the local streamlines of the combustion gases. In such an embodiment, the cooling hole 300 has a leading edge 302 and a trailing edge 352. The leading edge 302 generally has a convex portion 304, a concave portion 306, and a convex portion 308. In one exemplary embodiment, the convex portion 304 transitions directly into the concave portion 306, which transitions directly into the convex portion 308. The trailing edge 352 is generally convex. As such, the cooling hole 300 generally has no straight portions. The cooling hole 300 is generally symmetrical about the x-axis 380 and asymmetrical about the y-axis 390.

Figure 4:
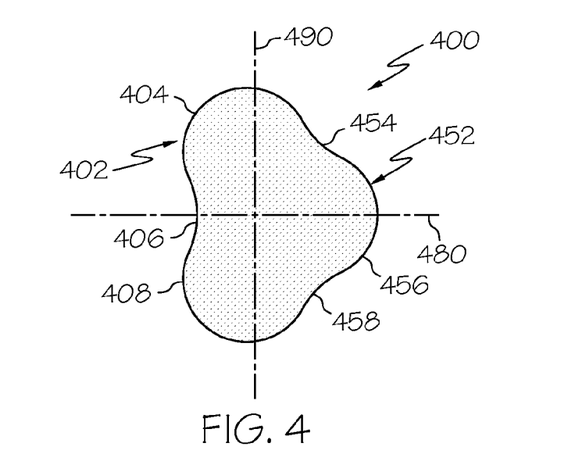

FIG. 4 is a cross-sectional view of a cooling hole 400, which may represent any of the cooling holes 220 discussed in reference to FIG. 2, in accordance with a further exemplary embodiment. The cooling hole 400 may be, for example, triad-shaped. In general, the triad-shape of the cooling hole 400 may be formed by a grouping of three overlapping circles.

The cooling hole 400 may be considered to have an x-axis 480 and a y-axis 490, as shown in FIG. 4. The cooling hole 400 may be oriented in any suitable manner, and in one exemplary embodiment, the cooling hole 400 is oriented such that the x-axis 480 is parallel to the local streamlines of the combustion gases. In such an embodiment, the cooling hole 400 has a leading edge 402 and a trailing edge 452. The leading edge 402 generally has a convex portion 404, a concave portion 406, and a convex portion 408. In one exemplary embodiment, the convex portion 404 transitions directly into the concave portion 406, which transitions directly into the convex portion 408. The trailing edge 452 generally has a concave portion 454, a convex portion 456, and a concave portion 458. In one exemplary embodiment, the concave portion 454 transitions directly into the convex portion 456, which transitions directly into the concave portion 458. As such, the cooling hole 400 generally has no straight portions and the concave portions 406, 454, 458 alternate with the convex portions 404, 408, 456. The cooling hole 400 is generally symmetrical about the x-axis 480 and asymmetrical about the y-axis 490.

Figure 5:
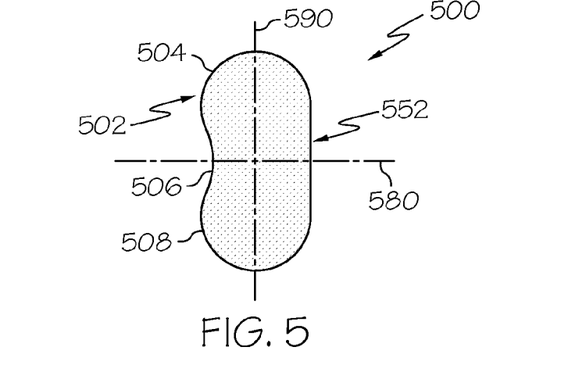

FIG. 5 is a cross-sectional view of a cooling hole 500, which may represent any of the cooling holes 220 discussed in reference to FIG. 2, in accordance with a further exemplary embodiment. The cooling hole 500 may have, for example, a reverse B-shape.

The cooling hole 500 may be considered to have an x-axis 580 and a y-axis 590, as shown in FIG. 5. The cooling hole 500 may be oriented in any suitable manner, and in one exemplary embodiment, the cooling hole 500 is oriented such that the x-axis 580 is parallel to the local streamlines of the combustion gases. In such an embodiment, the cooling hole 500 has a leading edge 502 and a trailing edge 552. The leading edge 502 generally has a convex portion 504, a concave portion 506, and a convex portion 508. In one exemplary embodiment, the convex portion 504 transitions directly into the concave portion 506, which transitions directly into the convex portion 508. The trailing edge 552 is generally straight. The cooling hole 500 is generally symmetrical about the x-axis 580 and asymmetrical about the y-axis 590.

Figure 6:
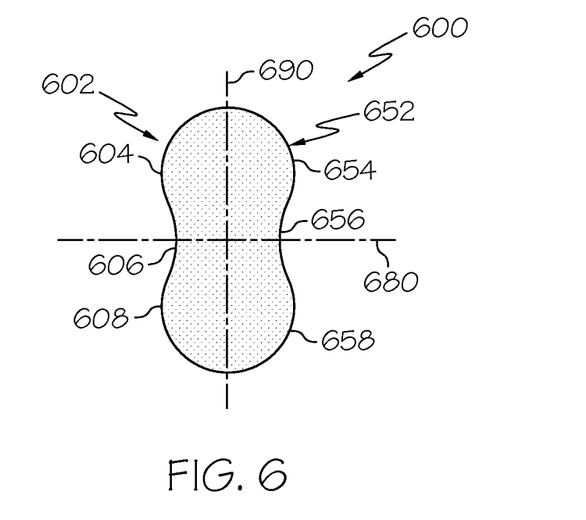

FIG. 6 is a cross-sectional view of a cooling hole 600, which may represent any of the cooling holes 220 discussed in reference to FIG. 2, in accordance with a further exemplary embodiment. The cooling hole 600 may be, for example, dumbbell-shaped.

The cooling hole 600 may be considered to have an x-axis 680 and a y-axis 690, as shown in FIG. 6. The cooling hole 600 may be oriented in any suitable manner, and in one exemplary embodiment, the cooling hole 600 is oriented such that the x-axis 680 is parallel to the local streamlines of the combustion gases. In such an embodiment, the cooling hole 600 has a leading edge 602 and a trailing edge 652. The leading edge 602 generally has a convex portion 604, a concave portion 606, and a convex portion 608. In one exemplary embodiment, the convex portion 604 transitions directly into the concave portion 606, which transitions directly into the convex portion 608. The trailing edge 652 generally has a convex portion 654, a concave portion 656, and a convex portion 658. In one exemplary embodiment, the convex portion 654 transitions directly into the concave portion 656, which transitions directly into the convex portion 658. As such, the cooling hole 600 generally has no straight portions. The cooling hole 600 is generally symmetrical about the y-axis 690 and asymmetrical about the x-axis 680. In other embodiments, the cooling hole 600 may generally symmetrical about the y-axis 690 and symmetrical about the x-axis 680.

Figure 7:
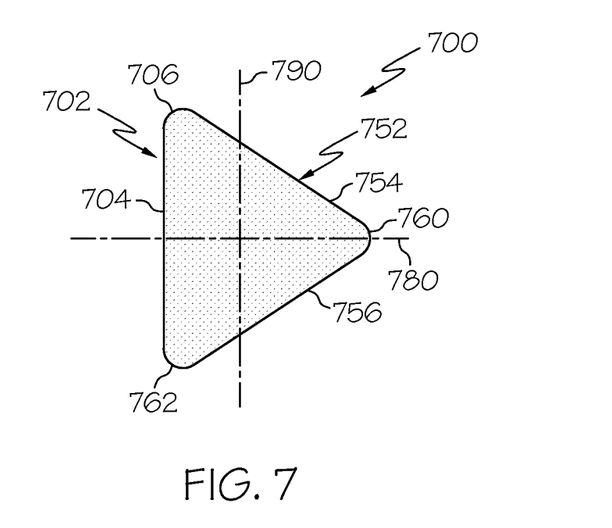

FIG. 7 is a cross-sectional view of a cooling hole 700, which may represent any of the cooling holes 220 discussed in reference to FIG. 2, in accordance with a further exemplary embodiment. The cooling hole 700 may be, for example, triangle-shaped.

The cooling hole 700 may be considered to have an x-axis 780 and a y-axis 790, as shown in FIG. 7. The cooling hole 700 may be oriented in any suitable manner, and in one exemplary embodiment, the cooling hole 700 is oriented such that the x-axis 780 is parallel to the local streamlines of the combustion gases. In such an embodiment, the cooling hole 700 has a leading edge 702 and a trailing edge 752. The leading edge 702 is generally straight and forms one of the sides 704 of the triangular shape. The trailing edge 752 is formed by the other two sides 754, 756 of the triangular shape. The sides 704, 754, 756 are generally straight and are joined at corners 706, 760, 762, which may be formed by curves or straight edge angles. The cooling hole 700 is generally symmetrical about the x-axis 780 and asymmetrical about the y-axis 790.

In general, the cross-sectional shapes of the holes 220, 300, 400, 500, 600, 700 facilitate the distribution of the cooling air substantially completely over the outer surface of the airfoil. In particular, the cross-sectional shapes function as a diffuser to reduce the velocity and increase static pressure of the cooling airstreams exiting the holes and encourage cooling film development. The holes 220, 300, 400, 500, 600, 700 additionally increase the lateral spread distribution of the exiting airflows, decrease peak velocities, and improve adiabatic effectiveness across a number of blowing ratios. These airstreams are more inclined to cling to the surface for improved cooling rather than separate from the surface. This produces an enhanced cooling effect at the surface. Consequently, exemplary embodiments promote the service life of the airfoil (e.g., airfoils 122, 124, 200) as a result of a more uniform cooling film at the external surfaces.

Figure 8:
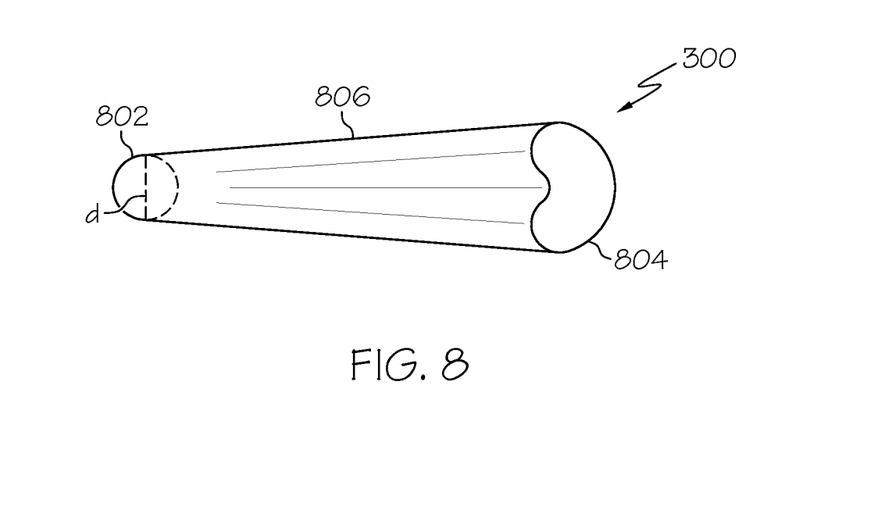
FIG. 8 is an exemplary perspective view of the cooling hole of FIG. 3.

FIG. 8 is an exemplary perspective view of the cooling hole of FIG. 3. In general, FIG. 8 illustrates an upstream end 802, a downstream end 804, and a transition portion 806 that transitions between the upstream end 802 and the downstream end 804. As noted above, the upstream end 802 is typically circular or cylindrical with a diameter d. In other embodiments, the upstream end 802 is oval with a minor diameter and a major diameter. As also noted above, the downstream end 804 in FIG. 8 corresponds to the bean-shape of the cooling hole 300 of FIG. 3. Additionally, the cooling holes 400, 500, 600, 700, 800 similarly have circular or oval upstream ends that transition into the downstream ends discussed above with reference to FIGS. 4-7.

FIGS. 9-13 are cross-sectional views of the cooling holes of FIG. 3-7 illustrating construction techniques. The techniques and dimensions discussed with reference to FIGS. 9-13 are exemplary and other techniques or dimensions may be provided.

Figure 9:
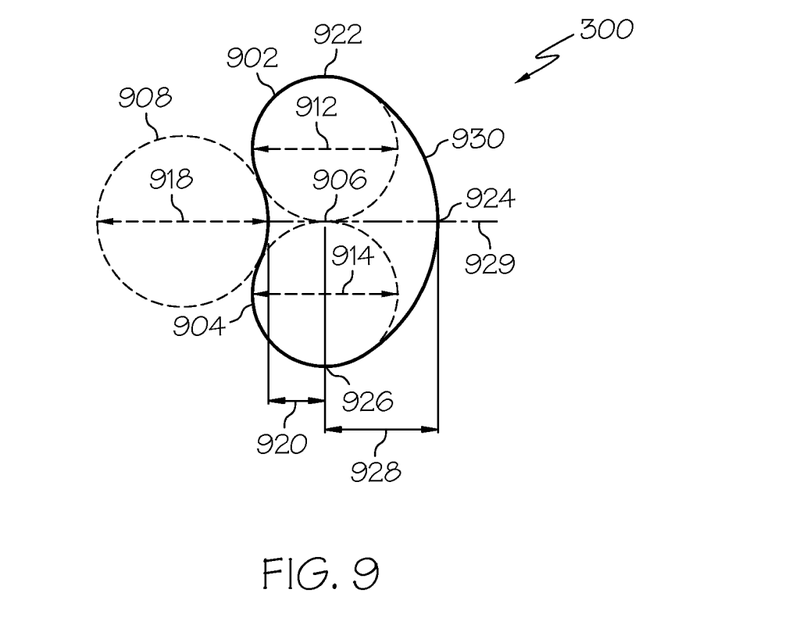
FIGS. 9-13 are cross-sectional views of the cooling holes of FIG. 3-7 illustrating construction techniques.

For example, the cooling hole 300 of FIG. 9 generally corresponds to the cooling hole 300 of FIG. 3. During construction, two identical construction circles 902, 904 are formed and joined at a tangent 906 that generally corresponds to the final center of the cooling hole 300. In one exemplary embodiment, the construction circles 902, 904 have diameters 912, 914 proportionate to the diameter d (e.g., d of FIG. 8) of the upstream end of the cooling hole 300. In one exemplary embodiment, the diameters 912, 914 may be, for example, about 1.6 d to about 1.7 d, particularly about 1.65 d. Next, a construction circle 908 is formed and joined at tangents to construction circles 902, 904. In one exemplary embodiment, the construction circle 908 has a diameter 918 proportionate to the diameter d (e.g., d of FIG. 8) of the upstream end of the cooling hole 300. If the upstream portion is an oval, diameter d may correspond to the minor diameter, although diameter d may also correspond to the major diameter. In one exemplary embodiment, the diameter 918 may be, for example, about 3.1 d to about 3.2 d, particularly about 3.15 d. A distance 920 from the edge of construction circle 908 to the center of construction circles 902, 904 may be defined as L. In a next step, a curve 930 extending through points 922, 924, 926 is formed. Points 922, 926 correspond to edges of construction circles 902, 904 opposite tangent 906. Point 924 is generally formed on a line 929 formed through the tangent 906 and the diameter 918 of construction circle 908. Point 924 is formed at a distance 928 that is proportionate to distance 920. For example, the distance 928 may be, for example, about 2.5 L. The final shape (indicated by solid lines) of the cooling hole 300 is formed by portions of construction circles 902, 904, 908 and curve 930.

Figure 10:
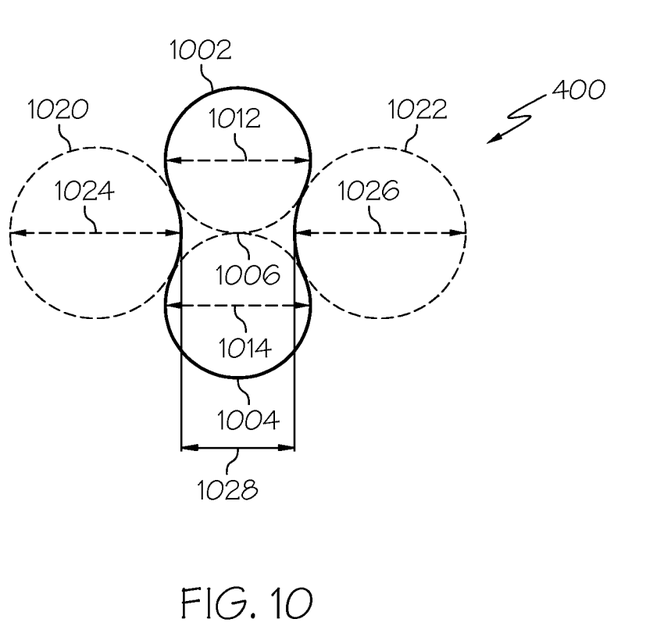

FIG. 10 illustrates a cooling hole 400 that generally corresponds to the cooling hole 400 of FIG. 4. During construction, two identical construction circles 1002, 1004 are formed and joined at a tangent 1006 that generally corresponds to the final center of the cooling hole 400. In one exemplary embodiment, the construction circles 1002, 1004 have diameters 1012, 1014 proportionate to the diameter d (e.g., d of FIG. 8) of the upstream end of the cooling hole 400. If the upstream portion is an oval, diameter d may correspond to the minor diameter, although diameter d may also correspond to the major diameter. In one exemplary embodiment, the diameters 1012, 1014 may be, for example, about 1.5 d to about 1.6 d, particularly about 1.53 d. Next, construction circles 1020, 1022 are formed and joined at tangents to construction circles 1002, 1004. In one exemplary embodiment, the construction circles 1020, 1022 have diameters 1024, 1026 proportionate to the diameter d (e.g., d of FIG. 8) of the upstream end of the cooling hole 400. In one exemplary embodiment, the diameters 1024, 1026 may be, for example, about 2 d. As such, the construction circles 1020, 1022 may be separated by a distance 1028. The distance 1028 may be, for example, about 1.1 d to about 1.2 d, particularly about 1.15 d. The final shape (indicated by solid lines) of the cooling hole 400 is formed by portions of construction circles 1002, 1004, 1020, 1022.

Figure 11:
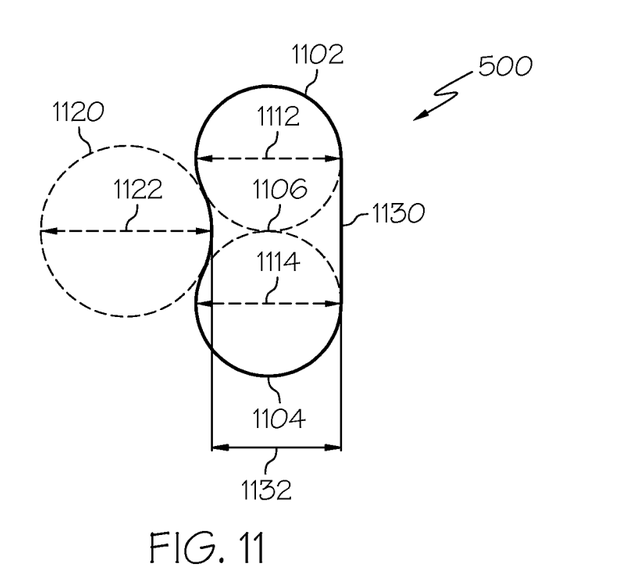

FIG. 11 illustrates a cooling hole 500 that generally corresponds to the cooling hole 500 of FIG. 5. During construction, two identical construction circles 1102, 1104 are formed and joined at a tangent 1106 that generally corresponds to the final center of the cooling hole 500. In one exemplary embodiment, the construction circles 1102, 1104 have diameters 1112, 1114 proportionate to the diameter d (e.g., d of FIG. 8) of the upstream end of the cooling hole 500. If the upstream portion is an oval, diameter d may correspond to the minor diameter, although diameter d may also correspond to the major diameter. In one exemplary embodiment, the diameters 1112, 1114 may be, for example, approximately equal to the diameter d. Next, construction circle 1120 is formed and joined at tangents to construction circles 1102, 1104. In one exemplary embodiment, the construction circle 1120 has a diameter 1122 proportionate to the diameter d (e.g., d of FIG. 8) of the upstream end of the cooling hole 500. In one exemplary embodiment, the diameter 1122 may be, for example, about 1 d to about 1.2 d, particularly about 1.1 d. A line 1130 tangent to both construction circles 1102, 1104 is formed, and a distance 1132 from line 1130 to construction circle 1120 may be, for example, about 0.85 d. The final shape (indicated by solid lines) of the cooling hole 500 is formed by portions of construction circles 1102, 1104, 1120 and line 1130.

Figure 12:
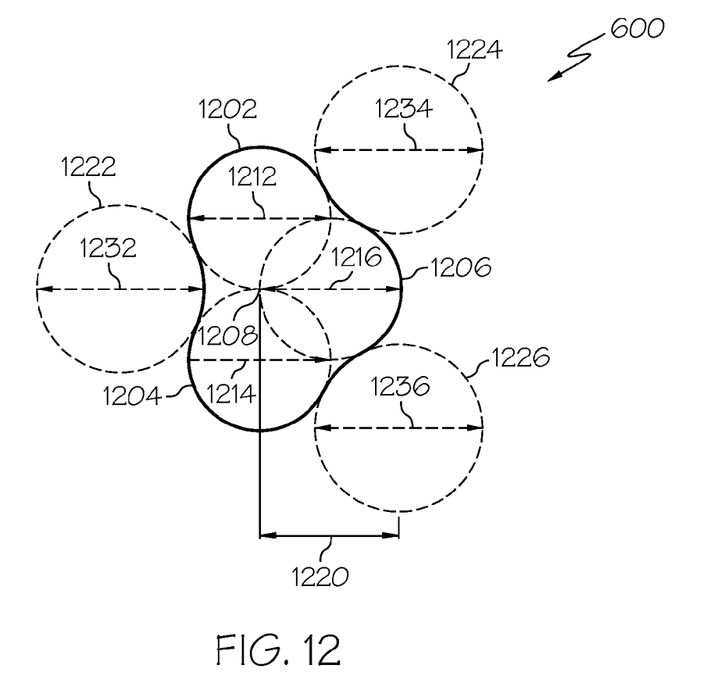

FIG. 12 illustrates a cooling hole 600 that generally corresponds to the cooling hole 600 of FIG. 6. During construction, two identical construction circles 1202, 1204 are formed and joined at a tangent 1208 that generally corresponds to the final center of the cooling hole 600. In one exemplary embodiment, the construction circles 1202, 1204 have diameters 1212, 1214 proportionate to the diameter d (e.g., d of FIG. 8) of the upstream end of the cooling hole 600. If the upstream portion is an oval, diameter d may correspond to the minor diameter, although diameter d may also correspond to the major diameter. In one exemplary embodiment, the diameters 1212, 1214 may be, for example, approximately equal to diameter d. Next, a construction circle 1206 is formed and is tangent to tangent 1208, as shown. In one exemplary embodiment, the construction circle 1206 has a diameter 1216 proportionate to the diameter d (e.g., d of FIG. 8) of the upstream end of the cooling hole 600. In one exemplary embodiment, the diameter 1216 may be, for example, approximately equal to diameter d. As such, a distance 1220 from the tangent 1208 to the opposite edge of construction circle 1206 may be, for example, approximately equal to diameter d. A construction circle 1222 with a diameter 1232 is formed and arranged tangent to construction circles 1202, 1204. In one exemplary embodiment, the diameter 1232 is proportionate to the diameter d (e.g., d of FIG. 8) of the upstream end of the cooling hole 600. In one exemplary embodiment, the diameter 1232 may be, for example, approximately equal to diameter d to about 1.2 d, particularly about 1.1 d. A construction circle 1224 with a diameter 1234 is formed and arranged tangent to construction circles 1202, 1206. In one exemplary embodiment, the diameter 1234 is proportionate to the diameter d (e.g., d of FIG. 8) of the upstream end of the cooling hole 600. In one exemplary embodiment, the diameter 1234 may be, for example, approximately 2 d. Similarly, a construction circle 1226 with a diameter 1236 is formed and arranged tangent to construction circles 1204, 1206. In one exemplary embodiment, the diameter 1236 is proportionate to the diameter d (e.g., d of FIG. 8) of the upstream end of the cooling hole 600. In one exemplary embodiment, the diameter 1236 may be, for example, approximately 2 d. The final shape (indicated by solid lines) of the cooling hole 600 is formed by portions of construction circles 1202, 1204, 1206, 1222, 1224, 1226.

Figure 13:
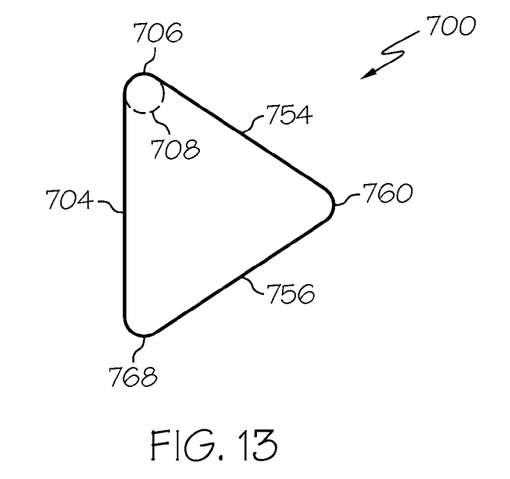

FIG. 13 illustrates a cooling hole 700 that generally corresponds to the cooling hole 700 of FIG. 7. During construction, three generally straight sides 704, 754, 756 are formed. The sides 704, 754, 756 may have a length proportionate to the diameter d (e.g., d of FIG. 8) of the upstream end of the cooling hole 700. If the upstream portion is an oval, diameter d may correspond to the minor diameter, although diameter d may also correspond to the major diameter. In one exemplary embodiment, the sides 704, 754, 756 may have a length, for example, about 1.3 d to about 1.5 d, particularly about 1.4 d. In general, corners 706, 760, 762 may be formed with a radius of curvature of about 0.12 d. In other words, the corners 706, 760, 762 may be formed with construction circles having an exemplary diameter of about 0.24 d, such as shown by construction circle 708. The final shape (indicated by solid lines) of the cooling hole 700 is formed by sides 704, 754, 756 and corners 706, 760, 762.

Exemplary embodiments disclosed herein are generally applicable to air-cooled components, and particularly those that are to be protected from a thermally and chemically hostile environment. Notable examples of such components include the high and low pressure turbine nozzles and blades, shrouds, combustor liners and augmentor hardware of gas turbine engines. Additionally, the cooling holes discussed above may be incorporated into turbine components. The advantages are particularly applicable to gas turbine engine components that employ internal cooling to maintain the service temperature of the component at an acceptable level while operating in a thermally hostile environment.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine component, comprising:
    a body; and
    a plurality of cooling holes formed in the body, at least one of the cooling holes having a cross-sectional shape with a first concave portion and a first convex portion,
    wherein the cross-sectional shape has a leading edge and a trailing edge, wherein the leading edge includes the first convex portion transitioning into the first concave portion, the first concave portion transitioning into a second convex portion, and wherein the trailing edge includes a third convex portion.

2. The engine component of claim 1, wherein the cross-sectional shape is bean-shaped.

3. The engine component of claim 1, wherein the cross-sectional shape is triad-shaped.

4. The engine component of claim 1, wherein the trailing edge includes a second concave portion transitioning into the third convex portion, the third convex portion transitioning into a third concave portion.

5. The engine component of claim 1, wherein the cross-sectional shape is reverse B-shaped.

6. The engine component of claim 1, wherein the cross-sectional shape is dumbbell-shaped.

7. The engine component of claim 1, wherein the body is an airfoil body.

8. The engine component of claim 1, wherein the body is a stator vane body.

9. The engine component of claim 1, wherein the body is a rotor blade body.

10. The engine component of claim 1, wherein the body is hollow.

11. The engine component of claim 1, wherein the body has a suction side and a pressure side.

12. An engine component, comprising:

a body; and a plurality of cooling holes formed in the body, at least one of the cooling holes having a cross-sectional shape with a first concave portion and a first convex portion, wherein the cross-sectional shape has a leading edge and a trailing edge, wherein the leading edge includes the first convex portion transitioning into the first concave portion, the first concave portion transitioning into a second convex portion, and wherein the trailing edge is generally straight.

13. An engine component, comprising:

a body; and a plurality of cooling holes formed in the body, at least one of the cooling holes having a cross-sectional shape with a first concave portion and a first convex portion, wherein the cross-sectional shape has a leading edge and a trailing edge, wherein the leading edge includes the first convex portion transitioning into the first concave portion, the first concave portion transitioning into a second convex portion, and wherein the trailing edge includes a third convex portion transitioning into a second concave portion, the second concave portion transitioning into a fourth convex portion.

* * * * *